United States Patent
Han et al.

(10) Patent No.: US 8,399,375 B2
(45) Date of Patent: Mar. 19, 2013

(54) SUPPORTED METALLOCENE CATALYST COMPOSITION AND A PROCESS FOR THE PREPARATION OF POLYOLEFIN USING THE SAME

(75) Inventors: Seungyeol Han, Daejeon (KR);
Myungahn Ok, Daejeon (KR);
Young-Soo Ko, Gwangmyeong-si (KR);
Chang-il Lee, Gyeonggi-do (KR)

(73) Assignees: SK Global Chemical Co., Ltd., Seoul (KR); SK Innovation Co., Ltd., Seoul (KR)

( * ) Notice: Subject to any disclaimer, the term of this patent is extended or adjusted under 35 U.S.C. 154(b) by 68 days.

(21) Appl. No.: 12/933,796

(22) PCT Filed: Mar. 26, 2009

(86) PCT No.: PCT/KR2009/001546
§ 371 (c)(1),
(2), (4) Date: Jan. 10, 2011

(87) PCT Pub. No.: WO2009/120026
PCT Pub. Date: Oct. 1, 2009

(65) Prior Publication Data
US 2011/0105705 A1    May 5, 2011

(30) Foreign Application Priority Data
Mar. 28, 2008  (KR) ........................ 10-2008-0028740

(51) Int. Cl.
*C08F 4/02*    (2006.01)
*C08F 4/6592*  (2006.01)
*C08F 10/00*   (2006.01)
*B01J 31/22*   (2006.01)

(52) U.S. Cl. ........ 502/123; 502/103; 502/120; 502/132; 502/152; 526/129; 526/141; 526/160; 526/165; 526/348; 526/943

(58) Field of Classification Search ............. 502/103, 502/120, 123, 132, 152; 526/129, 141, 160, 526/165, 943
See application file for complete search history.

(56) References Cited

U.S. PATENT DOCUMENTS

| | | | |
|---|---|---|---|
| 4,808,561 A | 2/1989 | Welborn, Jr. | |
| 4,904,631 A | 2/1990 | Chang | |
| 4,912,075 A | 3/1990 | Chang | |
| 4,935,397 A | 6/1990 | Chang | |
| 4,937,217 A | 6/1990 | Chang | |
| 5,643,847 A | 7/1997 | Walzer, Jr. | |
| 5,972,823 A | 10/1999 | Walzer, Jr. | |
| 6,087,293 A | 7/2000 | Carnahan et al. | |
| 6,368,999 B1 | 4/2002 | Speca | |
| 6,506,858 B1 | 1/2003 | Knuuttila et al. | |
| 6,774,079 B1 | 8/2004 | Taylor et al. | |
| 2003/0166455 A1 | 9/2003 | Shin et al. | |
| 2005/0113243 A1 | 5/2005 | Thorn et al. | |
| 2006/0116490 A1 | 6/2006 | Paczkowski et al. | |
| 2007/0270560 A1 * | 11/2007 | Lavastre et al. ............... | 526/160 |
| 2009/0156761 A1 * | 6/2009 | Razavi et al. ................. | 526/130 |

FOREIGN PATENT DOCUMENTS

| | | |
|---|---|---|
| CA | 2417412 A1 | 2/2002 |
| CN | 1890270 A | 1/2007 |
| KR | 100354290 B1 | 1/2001 |
| KR | 1020010083334 A | 9/2001 |
| KR | 20020090447 A | 12/2002 |
| WO | 0078827 A1 | 12/2000 |
| WO | 0181436 A1 | 11/2001 |

OTHER PUBLICATIONS

Sinn et al. Living Polymers on Polymerization with Extremely Productive Ziegler Catalysts. 1980. pp. 390-392. 39(5).

* cited by examiner

*Primary Examiner* — Caixia Lu
(74) *Attorney, Agent, or Firm* — The Webb Law Firm

(57) ABSTRACT

The invention relates to a supported metallocene catalyst composition and a process for the preparation of polyolefin using the same. A supported metallocene catalyst composition according to the invention is prepared by bringing a compound of a group IV transition metal into contact with an inorganic or organic porous carrier treated with an ionic compound. Advantages of a supported metallocene catalyst composition of the invention include an increase in the catalyst activity during polymerization of slurry and an olefin compound in the vapor phase even at a low content of metallocene metal components within the carrier, and an improvement in solving process problems such as fouling, sheeting, plugging or the like.

13 Claims, No Drawings

SUPPORTED METALLOCENE CATALYST COMPOSITION AND A PROCESS FOR THE PREPARATION OF POLYOLEFIN USING THE SAME

TECHNICAL FIELD

The present invention relates to a supported metallocene catalyst composition, a process for the preparation of olefin polymer using the same, and an olefin polymer prepared by using the supported metallocene catalyst composition.

BACKGROUND ART

An olefin polymerization catalyst may be classified as a Ziegler-Natta heterogeneous catalyst or a metallocene single-site catalyst, and a metallocene according to the present invention has been developed for producing various polyolefin products since it was reported by Kaminski at 1980. The metallocene catalyst is composed of the combination of main catalyst having a transition metal compound as a principle ingredient with a co-catalyst having aluminum or boron as a principle ingredient. The polyolefin produced using the metallocene homogeneous single-site catalyst has a very narrow and homogeneous molecular weight distribution and chemical compositional distribution, and it is possible to freely control the tacticity, the comonomer response, the hydrogen response as the ligand structure of the metallocene catalyst, and to largely improve the related physical properties of the polyolefin compared to the use of a Ziegler-Natta catalyst.

In order to apply the metallocene catalyst to a slurry or vapor phase olefin polymerization process, an immobilization support is needed. The reason is that processing problems such as agglomeration, fouling, sheeting, plugging phenomenon or the like of the produced polymer in case of incorporating the homogeneous metallocene catalyst into the vapor phase polymerization process are encountered, thus the shape of the produced polyolefin polymer particle is very irregular and the apparent density is low so that the production of the product is impossible.

In order to solve these several problems, a study on the immobilization was conducted on the polymerization method of the polyolefin including supporting the metallocene alone or metallocene and co-catalyst using several porous inorganics or organics such as silica, alumina, magnesium dichloride and the like to prepare the metallocene supported catalyst, and applying them to the slurry or vapor phase polymerization process.

Conventional metallocene catalyst supporting methods include for example, supporting the metallocene after treating by adding an aluminum compound, that is, trimethylaluminum, triethylaluminum and the like to the unplasticized silica (U.S. Pat. Nos. 4,937,217, 4,912,075 and 4,935,397), preparing the metallocene supported catalyst by adding the metallocene after surface-treating the plasticized silica by methylaluminoxane or surface-treating the silica containing water by alkylaluminum (U.S. Pat. Nos. 4,808,561, 4,912,075 and 4,904,631), etc. In addition, synthesizing the metallocene supported catalyst by adding metallocene after surface-treating the silica by using the boron-based organometallic material instead of the aluminum organometallic compound (U.S. Pat. No. 6,087,293), and preparing the metallocene supported catalyst by surface-treating of the silica by using the organic compound instead of organometallic compound of aluminum or boron-based and contacting them with metallocene (U.S. Pat. Nos. 5,643,847 and 5,972,823) are known, and attaching the metallocene catalyst to the silica surface by forming the covalent-bonding through the chemical reaction (Korean Patent Application No. 10-1999-0023575 and Korean Patent No. 10-0536181) are known.

However, by preparing the supported metallocene catalyst by the above-mentioned methods, there are disadvantages in that the catalyst component is not homogeneously supported in the pore, the time required for preparing the catalyst is long, and the activity of the catalyst is low. In addition, problems such as deactivation and a hot spot in the reactor may be caused because aluminoxane is not homogeneously distributed in the pore. The polymerized polymer particle is able to cause the fouling or plugging phenomenon by dissolving out the catalyst component in the supported metallocene catalyst in the slurry polymerization process. The method for preparing the supported metallocene catalyst through the chemical bonding that was already developed to solve the above-mentioned catalyst elution problem has disadvantages in that the cost for preparing catalyst is high and the activity of the prepared catalyst is low due to the method requiring several stages.

DISCLOSURE

Technical Problem

An object of the present invention is to provide a supported metallocene catalyst for olefin polymerization by surface-treating the carrier surface of the inorganics and organics by using an ionic compound, and supporting the metallocene compound and the needed co-catalyst, etc. on the surface of the ionic compound, further to provide the method for producing the various polyolefin products showing high-activity and the process driving stability in the slurry or vapor phase olefin polymerization including the single reactor or multiple reactor, and the supported metallocene catalyst providing an increase in the catalyst activity during polymerization of the slurry and vapor phase olefin compound even at low content of metallocene metal components within the carrier, and an improvement in solving process problems such as fouling, sheeting, plugging, or the like.

Technical Solution

To achieve the object of the present invention, the present invention provides a supported metallocene catalyst composition by treating the surface of an inorganic or organic porous carrier and the surface on the pore with an ionic compound pairing cation and anion, and contacting the metallocene catalyst and alkylaluminoxan or boron compound-based co-catalyst among the aliphatic carbohydrate with the above, and the method for preparing an olefin polymer by polymerizing the olefin monomer or olefin-based comonomer thereof by using the metallocene supported catalyst composition.

Hereinafter, the characteristics of the present invention will be described in detail.

The supported metallocene catalyst composition for polymerizing an olefin according to the present invention is prepared by supporting a Group IV transition metal compound represented by the following Chemical Formula 1 upon an inorganic or organic porous carrier treated by an ionic compound represented by the following Chemical Formula 2.

$$Cp'L^1ML^2_n \qquad \text{[Chemical Formula 1]}$$

where,

M is a Group IV transition metal of the Periodic Table of the Elements;

Cp' is a cyclopentadienyl containing group being able to form $\eta^5$-bond with central metal M;

$L^1$ is a fused ring having cyclopentadiene, cyclopentadienyl ring or an anionic ligand including (C1-C20) hydrocarbon substituent and O, N or P atom;

$L^2$ is halogen atom, (C1-C20) alkyl group, (C6-C30) aryl (C1-C20) alkyl group, (C3-C20) cycloalkyl group, (C1-C20) alkoxy group, (C6-C30) aryloxy group, (C6-C30) aryl group, (C1-C20) alkyl substituted or (C6-C30) aryl substituted silyl group, (C1-C20) alkyl substituted or (C6-C30) aryl substituted amino group, (C1-C20) alkyl substituted or (C6-C20) aryl substituted siloxy group, and (C1-C20) alkyl substituted or (C6-C30) aryl substituted phosphine group;

n is an integer of 1 or 2;

Cp' and $L^1$ are optionally bridged through a silicon containing group or (C1-C4) alkenylene group;

the cyclopentadienyl ring or cyclopentadienyl fused ring of the Cp' and $L^1$ may be further substituted with (C1-C20) alkyl group, (C6-C30) aryl group, (C2-C20) alkenyl group or (C6-C30) aryl (C1-C20) alkyl group.

In other words, the carrier upon which the metallocene catalyst represented by the Chemical Formula 1 in the metallocene supported catalyst composition is supported, is an adaptation of a porous inorganic or organic material carrier having a hydroxy group on the surface of the carrier pore. The carrier having the hydroxy group on the surface of the carrier pore may be obtained by physicochemically surface-treating the surface inside and outside the carrier pore by treating for sufficiently wetting with an ionic compound having liquid or solid phase in the inorganic or organic porous carrier at room temperature and pairing a cation and anion.

The ionic compound useful in the present invention includes all of the commercialized ionic compounds, and further new ionic compound may be used through the synthesis depending upon the selected metallocene catalyst, the structure of the co-catalyst and the type of the carrier. The characteristic of the commercialized or synthesizable ionic compound is that the vapor pressure of the ionic compound is close to 0, and is polar to liquid or solid phase. The polarity depends on the type of anion material, various types of ionic material including from very weak polarity to very strong polarity may be adopted, and also ionic compounds not containing the impurity may be used if the molecular structure of the metallocene catalyst is not changed to be inert. The metallocene supported catalyst composition according to the present invention is exemplified by forming the ionic compound pairing a cation ($X^+$) and anion ($Y^-$) such as the compound represented by the following Chemical Formula 2, but the ionic compound is not limited thereto.

$$X^+Y^-$$ [Chemical Formula 2]

where, $X^+$ is imidazolium ion, pyridium ion, ammonium ion, phosphonium ion, sulfonium ion, pyrazolium ion or pyrrolidium ion;

$Y^-$ is $BF_4^-$, $PF_6^-$, $AlCl_4^-$, halogen$^-$, $CH_3CO_2^-$, $CH_3CO_2$, $CH_3SO_4^-$. $CF_3SO_3^-$, $(CF_3SO_2)N^-$, $NO_3^-$, $SbF_6^-$, $Sb_2F11^-$, $MePhSO_3^-$, $(CF_3SO_2)_2N^-$, $(CF_3SO_2)_3C^-$ or $(OR)_2PO_2^-$.

In the Chemical Formula 2, the cation (X+) is exemplified by following Table 1.

TABLE 1

| Cation Structure ($X^+$) | [imidazolium structure] | [pyridinium structure] | [ammonium structure] | [phosphonium structure] | [sulfonium structure] | [pyrazolium structure] | [pyrrolidium structure] |
|---|---|---|---|---|---|---|---|
| Structure Name | imidazolium ion | pyridinium ion | ammonium ion | phophonium ion | sulfonium ion | pyrazolium ion | pyrrolidium ion |

In the above-mentioned table, R, $R_1$ to $R_3$ are selected from the alkyl groups that the functional group such as an alkyl group or —OH, —$SO_3H$, —COOH, amine, silane, alkoxy, and the like is attached.

In the above-mentioned Chemical Formula 2, the anion ($Y^-$) is exemplified by following Table 2.

TABLE 2

| Anion($Y^-$) | Anion Name | Anion($Y^-$) | Anion Name |
|---|---|---|---|
| $BF_4^-$ | tetrafluoroborate | $(CF_3SO_2)N^-$ | bis[(trifluoromethyl)sulfonyl |
| $PF_6^-$ | hexafluorophsphate | $NO_3^-$ | nitrate |
| $AlCl_4^-$ | aluminium chloride | $SbF_6^-$ | hexafluoroanimonate |
| $Cl^-$, $X^-$ | chloride, halogen | $Sb_2F11^-$ | |
| $CH_3CO_2^-$ | acetate | $MePhSO_3^-$ | tosylate |
| $CF_3CO_2^-$ | trifluoroacetate | $(CF_3SO_2)_2N^-$ | bis(trifluoromethylsulfonyl)imide |
| $CH_3SO_4^-$ | methylsulfate | $(CF_3SO_2)_3C^-$ | tris(trifluoromethylsulfonyl)methide |
| $CF_3SO_3^-$ | trifluoromethylsulfate | $(OR)_2PO_2^-$ | dialkyl phosphate |

Also, the ionic compound that may be used in the present invention includes for example, 1-butyl-3-methylimidazolium chloride, 1-butyl-3-methylimidazolium dibutylphosphate, 1-butyl-3-methylimidazolium dicyanamide, 1-butyl-3-methylimidazolium hexafluoroantimonate, 1-butyl-3-methylimidazolium hexafluorophosphate, 1-butyl-3-methylimidazolium hydrogencarbonate, 1-butyl-3-methylimidazolium hydrogensulfate, 1-butyl-3-methylimidazolium methylsulfate, 1-butyl-3-methylimidazolium tetrachloroaluminate, 1-butyl-3-methylimidazolium tetrachloroborate, 1-butyl-3-methylimidazolium thiocyanate, 1-dodecyl-3-methylimidazolium iodide, 1-ethyl-2,3-dimethylimidazolium chloride, 1-ethyl-3-methylimidazolium bromide, 1-ethyl-3-methylimidazolium chloride, 1-ethyl-3-methylimidazolium hexafluorophosphate, 1-ethyl-3-methylimidazolium tetrafluoroborate, 1-hexyl-3-methylimidazolium tetrafluoroborate, 1-butyl-4-methylpyridinium chloride, 1-butyl-4-methylpyridium tetrafluoroborate, 1-butyl-4-methylpyridium hexafluorophosphate, benzyldimethyltetradecylammonium chloride, tetraheptylammonium chloride, tetrakis(decyl)ammonium bromide, tributylmethylammonium chloride, tetrahexylammonium iodide, tetrabutylphosphonium chloride, tetrabutylphosphonium tetrafluoroborate, triisobutylmethylphosphonium tosylate 1-butyl-1-methylpyrrolidinium, 1-butyl-1-methyl-methylpyrrolidium bromide, 1-butyl-1-methylpyrrolidium tetrafluoroborate, 1-aryl-3-methylimidazolium bromide, 1-aryl-3-methylimidazolium chloride, 1-benzyl-3-methylimidazolium hexafluorophosphate, 1-benzyl-3-methylimidazolium bis(trifluoromethylsulfonyl)imide, 1-butyl-3-methylimidazolium dibutyl phosphate, 1-(3-cyanopropyl)-3-methylimidazolium bis(trifluoromethylsulfonyl)amide, 1,3-dimethylimidazolium dimethyl phosphate, 1-ethyl-2,3-dimethylimidazolium ethyl sulfate, and the like, preferably 1-ethyl-3-methylimidazolium aluminum chloride, 1-butyl-4-methylpyridium hexafluorophosphate, benzyldimethyltetradecylaluminum chloride, tributylmethylaluminum chloride, tetrabutylphosphonium tetrafluoroborate, 1-butyl-1-methylpyrrolidium chloride, 1-butyl-3-methylimidazolium tetrachloroaluminate, 1-butyl-4-methylpyridium chloride, 1-butyl-4-methylpyridium tetrafluoroborate, and the like.

The inorganic or organic porous carrier treated by the ionic compound has —OH groups remaining on the surface in the range of 0.001 to 100 mmol per 1 g of the carrier before treating.

The carrier treated by the ionic compound may be inorganic or organic and should have the pore and the surface area which can support the ionic compound, metallocene, and co-catalyst. The surface of the carrier has the hydrophobic functional group, or may be used by surface-treating with several silane-based compound, the aluminum-based compound, the halogen-based compound. The inorganic carrier that may be generally used includes carriers used in the supporting existing metallocene catalysts such as silica, alumina, magnesium chloride, magnesium oxide, and the like, in addition, materials such as mesoporous material, MCM-41, CMC-48, SBA-15, and the like may be used, and these have a surface area of more than 100 m$^2$/g and a pore volume of more than 0.1 cc/g. Clay compounds such as mineral clay, kaolin, talc, mica, montmorillonite, and the like may be used as the carrier. A material such as a polysiloxane-based polymer compound, polystyrene gel or bead, and the like may be adopted as an organic carrier. Those supported compounds may be used in their original condition, and may be used by controlling the amount of the hydrophobic functional group, etc. in the surface of the carrier pore by heat-treating at a temperature of 100 to 1000° C.

The composition of the ionic compound supported on the surface of the carrier is related to the physicochemical property of the carrier surface, such as the pore surface area of the carrier and the amount of the hydroxy groups (OH groups) on the carrier surface, however the ionic compound being mixed and contacted is suitably 0.001 to 50% by weight based on the treated support, particularly 0.1 to 40% by weight is preferred. In addition, the more the amount of the hydroxy groups remaining on the surface of the carrier, the amount of the ionic compound should be increased. In case of less than 0.001% by weight of the ionic compound, the treating effect is insignificant, and in case of over than 50% by weight, there is no synergy effect as much of the excess amount of the ionic compound is wasted.

In addition, examplea of the metallocene or non-metallocene catalyst that may be used in the present invention are as follows, however the invention is not necessarily limited thereto.

Cp' is a cyclopentadienyl containing group being able to form a η$^5$-bond with central metal M, can be selected from the group consisting of cyclopentadienyl, methylcyclopentadienyl, dimethylcyclopentadienyl, tetramethylcyclopentadienyl, pentamethylcyclopentadienyl, butylcyclopentadienyl, sec-butylcyclopentadienyl, tert-butylmethylcyclopentadienyl, trimethylsillylcyclopentadienyl, indenyl, methylindenyl, ethylindenyl, isopropylindenyl, florenyl, methylflorenyl, dimethylflorenyl and ethylflorenyl, isopropylflorenyl, and the concrete example of the compound of Chemical Formula 1 includes bis(cyclopentadienyl)zirconium dichloride, bis(m-ethylcyclopentadienyl)zirconium dichloride, bis(normalbutylcyclopentadienyl)zirconium dichloride, bis(cyclopentylcyclopentadienyl)zirconium dichloride, bis(cyclohexylcyclopentadienyl)zirconium dichloride, bis(1,3-dimethylcyclopentadienyl)zirconium dichloride, bis(isobutylcyclopentadienyl)zirconium dichloride, bis(indenyl)zirconium dichloride, bis(florenyl)zirconium dichloride, bis(4,5,6,7-tetrahydro-1-indenyl)zirconium dichloride, ethylene-bis(indenyl)zirconium dichloride, ethylene-[bis(4,5,6,7-tetrahydro-1-indenyl)]zirconium dichloride, dimethylsillyl-bis(indenyl)zirconium dichloride, diphenylsillyl-bis(indenyl)zirconium dichloride, isopropyl(cyclopentadienyl)(florenyl)zirconium dichloride, dimethylsillyl(cyclopentadienyl)(florenyl)zirconium dichloride, diphenylsillyl(cyclopentadienyl)(florenyl)zirconium dichloride, (cyclopentylcyclopentadienyl)(cyclopentadienyl)zirconium dichloride, (1-methyl-3-cyclopentylcyclopentadienyl) (cyclopentadienyl)zirconium dichloride, (1-ethyl-3-cyclopentylcyclopentadienyl) (cyclopentadienyl) zirconium dichloride, (1-butyl-3-cyclopentylcyclopentadienyl) (cyclopentadienyl)zirconium dichloride, (cyclopentylcyclopentadienyl) (cyclomethylcyclopentadienyl) zirconium dichloride, (1-methyl-3-cyclopentylcyclopentadienyl) (pentamethylcyclopentadienyl)zirconium dichloride, (1-ethyl-3-cyclopentylcyclopentadienyl) (pentamethylcyclopentadienyl) zirconium dichloride, (1-butyl-3-cyclopentylcyclopentadienyl) (pentamethylcyclopentadienyl) zirconium dichloride, (cyclohexylcyclopentadienyl) (cyclopentadienyl) zirconium dichloride, (1-methyl-3-cyclohexylcyclopentadienyl) (pentamethylcyclopentadienyl)zirconium dichloride, (1-ethyl-3-cyclohexylcyclopentadienyl)(pentamethylcyclopentadienyl) zircon ium dichloride, (1-butyl-3-cyclohexylcyclopentadienyl) (pentamethylcyclopentadienyl) zirconium dichloride, (cyclohyxylmethyllenylcyclopentadienyl)(cyclopentadienyl) zirco nium dichloride, (cycloheptylcyclopentadienyl) (cyclopentadienyl)zirconium dichloride, (1-methyl-3-cycloheptylcyclopentadienyl) (pentamethylcyclopentadienyl)zirco nium dichloride, (1-ethyl-3-cycloheptylcyclopentadienyl) (pentamethylcyclopentadienyl) zirconium dichloride, (1-butyl-3-cycloheptylcyclopentadienyl) (pentamethylcyclopentadienyl) zirconium dichloride, (cyclohexylethyllenylcyclopentadienyl) (cyclopentadienyl) zirconium dichloride, and the like. In addition, the metallocene compound and non-metallocene compound wherein the central metal includes titanium and hafnium transition metal may be used.

In the supported metallocene catalyst composition according to the present invention, the supported metallocene or non-metallocene organic metal catalyst (the transition metal compound of Chemical Formula 1) is suitably 0.01 to 10% by weight, and preferably 0.1 to 5% by weight based on the supported metallocene catalyst supported in the carrier being surface-treated with the ionic compound (based on the weight of the final supported catalyst including the carrier, the ionic liquid, the organic metal catalyst, co-catalyst, and the like).

The supported metallocene catalyst composition according to the present invention further includes alkylaluminoxane co-catalyst, organic aluminum co-catalyst or boron compound co-catalyst, or a mixture thereof.

As the aluminoxane compound used in the present invention, the aluminoxane represented by following Chemical Formula 3 is mainly used.

$$(-Al(R^4)-O-)_m$$ [Chemical Formula 3]

where, $R^4$ is (C1-C20) alkyl group, preferably methyl group or isobutyl group, and m is an integer of more than 5.

Examples of the aluminoxane compound include methylaluminoxane, ethylaluminoxane, propylaluminoxane, butylaluminoxane, isobutylaluminoxane, and the like.

The alkyl compound co-catalyst used in the present invention further includes the organic alkyl compound represented by Chemical Formula 4.

$$(R^5)_rAl(E)_{3-r}$$ [Chemical Formula 4]

where, $R^5$ is (C1-C8) alkyl group,

E is hydrogen atom or halogen atom, and r is an integer of 1 to 3.

Examples of alkylaluminum compounds include trialkyl aluminum including trimethylaluminum, triethylaluminum, tripropylaluminum, triisopropylaluminum, tributylaluminum, triisobutylaluminum, triisorenylaluminum, and the like, dialkylaluminum chloride including dimethylaluminum chloride, diethylaluminum chloride, dipropylaluminum chloride, diisobutylaluminum chloride and dihexylaluminumchloride, alkylaluminum dichloride including methylaluminum dichloride, ethylaluminum dichloride, propylaluminum chloride, isobutylaluminum chloride, and the like, and preferably trialkylaluminum chloride, or triisobutylaluminum chloride.

The boron compound that may be used as the co-catalyst in the present invention may be selected from the compounds represented by the following Chemical Formulae 5 to 7.

$$B(R^6)_3$$ [Chemical Formula 5]

$$[R^7]^+[E(R^6)_4]^-$$ [Chemical Formula 6]

$$[(R^8)_qZH]^+[B(R^6)_4]^-$$ [Chemical Formula 7]

where,

B is a boron atom;

$R^6$ is phenyl group, or fluorine atom or phenyl group having 3 to 5 substituents selected from (C1-C4)alkyl group or (C1-C4)alkoxy group substituted with fluorine atom or unsubstituted;

$R^7$ is cyclic (C5-C7) aromatic cation or alkyl substituted cation, for example triphenylmethyl cation;

Z is nitrogen or phosphor atom;

$R^8$ is (C1-C4) alkylradical or anylinium radical substituted with two (C1-C4) alkyl groups together with a nitrogen atom; and q is an integer of 2 or 3.

Examples of the boron compound co-catalyst include preferably tris(pentafluorophenyl) borane, tris(2,3,5,6-tetrafluorophenyl) borane, tris(2,3,4,5-tetrafluorophenyl) borane, phenylbis(pentafluorophenyl) borane, tetrakis(pentafluorophenyl)borate, tetrakis(2,3,5,6-tetrafluorophenyl)borate, tetrakis(2,3,4,5-tetrafluorophenyl) borate, tetrakis(3,4,5-tetrafluorophenyl)borate, tetrakis(2,2,4-trifluorophenyl)borate, phenylbis(pentafluorophenyl)borate or tetrakis(3,5-bistrifluoromethylphenyl)borate.

In addition, when an aluminum-based co-catalyst such as methylaluminoxane or alkylaluminum compound and boron-based co-catalyst are used, it is suitably as 0.01 to 50% by weight, preferably 0.1 to 30% by weight based on the supported metallocene catalyst being supported in the carrier being surface-treated with the ionic compound (the final supported catalyst).

When the carrier is surface-treated with the ionic compound by dissolving the transition metal compound of Chemical Formula 1 in an organic solvent like methylaluminoxane, the molar ratio of two components such as metallocene and co-catalyst in the final supported catalyst is suitably 1:0.01 to 1:1000, particularly 1:1 to 1:500, based on the molar ratio of the transition metal:aluminum.

When the boron compound is used as co-catalyst, the molar ratio of the transition metal compound of Chemical Formula 1:the boron compound co-catalyst is suitably 1:0.01 to 1:100, particularly 1:0.1 to 1:20, based on the molar ratio of the transition metal:aluminum. In addition, the molar ratio of the boron compound co-catalyst and aluminum compound is suitably 1:0.1 to 1:100, preferably 1:1 to 1:20, based on the boron:aluminum.

The present invention also provides a process for preparing olefin polymer by using the metallocene supported catalyst composition for the olefin polymerization, wherein the olefin polymer includes homopolymer or copolymer of alphaolefin.

Examples of olefin-based monomers useful in the process of the present invention include ethylene, alphaolefin, cycloolefin, and the like, dien-based monomer, trine-based olefine, styrene-based olefin and cyclic olefin.

Example of such monomers include ethylene, propylene, 1-butene, 1-pentene, 1-hexene, 1-octene, 1-decene, 1-dodecene, 1-tetradecene, 1-hexadecene, 1-octadecene, 1-eicocene, 4-methyl-1-pentene, 3-methyl-1-pentene and 3-methyl-1-butene, styrene, par-methylstyrene, allylbenzene, divinylbenzene, vinylcyclohexane, vinylcycloheptane, cyclopentene, cycloheptene, norbornene, tetracyclododecene, isoprene, 1,3-butadiene, 1,4-pentadiene, 1,4-hexadiene, cyclopentadiene, and it is possible to polymerize by mixing the monomers alone or two or more.

Hereinafter, a method for preparing the supported metallocene catalyst composition according to the present invention will be described.

The inorganic or organic porous carrier being treated with the ionic compound upon which the transition metal compound is supported may be prepared by the following method:
a) mixing, bringing the ionic compounds alone, into contact with a carrier without solvent, or
b) mixing the carrier and the ionic compound with the aliphatic or aromatic hydrocarbon solvent to prepare the slurry; isolating and drying the slurry to flow inert gas such as nitrogen, argon between 100 to 900° C. or treat through the vacuum in order to control the amount of hydroxy groups on the surface of the inorganic carrier (such as silica.

In this case, the amount of the hydroxy groups remaining on the surface is suitably 0.001 to 100 mmol-OH/g-silica, preferably 0.1 to 5 mmol-OH/g-silica. The above requirement is the requirement for the carrier before being treated with the ionic compound, the ionic compound is added as needed to the flask of the silica being prepared in the carrier, when adding it is fine to add with the organic solvent. The amount of the added ionic compound is similar to or greater than the amount of OH groups on the silica surface.

The silica and ionic compound are sufficiently mixed for more than one hour under nitrogen atmosphere at a temperature of greater than the melting point of the ionic compound to contact the ionic compound with the silica surface and the hydroxy groups on the silica surface. When using the organic solvent, the organic solvent is removed after treating the surface, and then the next step is taken. The metallocene compound and co-catalyst methylaluminoxane (MAO) are dissolved in the organic solvent (such as toluene) in another flask, and the molar ratio of the metallocene and aluminum of the co-catalyst is suitably 1:0.1 to 1:3000, and preferably 1:1 to 1:500 based on the transition metal aluminum. The metallocene solution is added to the silica being surface-treated with the ionic compound, and stirred under nitrogen atmosphere at a suitable temperature for a suitable time, to support the metallocene and the co-catalyst. Then, the resulting product is washed more than three times by using an organic solvent such as toluene, etc., and drying with the vacuum or nitrogen gas, etc., to remove unsupported metallocene and catalyst, and finally the metallocene catalyst supported in the carrier surface-treated with the ionic compound is obtained.

Another method for preparing the supported metallocene catalyst is as follows. After the heat-treated silica is surface-treated as above by using the ionic compound, the metallocene compound is added to the surface-treated silica by dissolving alone or with organic solvent (such as toluene), and stirred at a suitable temperature for a suitable time, under nitrogen atmosphere to support the metallocene compound. Then, the resulting product is washed more than three times by using an organic solvent such as toluene, etc., and drying with the vacuum or nitrogen gas, etc., to remove unsupported metallocene and catalyst, and finally the metallocene catalyst supported in the carrier surface-treated with the ionic compound is obtained. The catalyst supported with the metallocene alone in the carrier surface-treated with the obtained supported ionic compound may be used by adding the co-catalyst necessary to the polymerization of the polymer (such as polyolefin, etc.) to the polymerization solvent, etc.

Another method for preparing the supported metallocene catalyst of the present invention is as follows.

After the heat-treated silica is surface-treated as above by using the ionic compound, MAO or the borate-based co-catalyst is added to the surface-treated silica by dissolving an organic solvent (such as toluene), and mixed at a suitable temperature for a suitable time, under a nitrogen atmosphere to support. Then, in order to remove the unsupported MAO, the product is washed more than three times using an organic solvent (such as toluene), etc., and dried under vacuum or nitrogen gas, etc., and finally the carrier surface-treated with the ionic compound and co-catalyst is obtained. The metallocene is supported on the silica being supported co-catalyst on the ionic compound by dissolving metallocene compound in an organic solvent (such as toluene), adding them to the surface-treated silica and stirring at a suitable temperature for a suitable time, under a nitrogen atmosphere. Then, in order to remove the unsupported metallocene compound, the product is washed more than three times by using an organic solvent (such as toluene), etc., and dried under vacuum or nitrogen gas, etc., and finally the metallocene catalyst supported on the carrier surface-treated with the ionic compound is obtained.

Another method for preparing the metallocene supported catalyst of the present invention is as follows.

After the heat-treated silica is surface-treated as above by using the ionic compound, the metallocene compound and co-catalyst of the co-catalyst boron compound, co-catalyst of aluminum alkyl based are dissolved in an organic solvent (such as toluene) in another flask, and the molar ratio of the metallocene and boron of the co-catalyst is suitably 1:0.1 to 1:100, and preferably 1:0.5 to 1:30. In addition, the molar ratio of the metallocene and aluminum alkyl compound is suitably 1:0.1 to 1:100.

The metallocene compound and borate-based co-catalyst solution are added to the silica being surface-treated with the ionic compound, stirred and mixed under nitrogen atmosphere at a suitable temperature for a suitable time to support the metallocene compound and co-catalyst. Then, in order to remove the unsupported metallocene compound and co-catalyst, the product is washed more than three times by using an organic solvent (such as toluene), etc., and dried under vacuum or nitrogen gas, etc., and finally the metallocene catalyst supported in the carrier surface-treated with the ionic compound is obtained.

The amount of the transition metal in the supported catalyst prepared by the above method is analyzed as 0.05 to 1.5% by weight.

The metallocene supported catalyst supported in the above obtained ionic compound is able to multiple polymerization by using one type of olefin monomer or more than two types of these monomers, and the polymerization of the olefin monomer is carried out in a slurry of organic solvent such as hexane, etc. or the vapor phase. The catalyst according to the present invention is used by dispersing it in the reaction solvent in the absence of water, as the polymerization reaction solvent, generally an aliphatic hydrocarbon or the mixture thereof is used and is for example, propane, isobutane, isopentane, hexane, heptane, octane, etc.

The metallocene supported catalyst of the present invention is able to be used in the vapor phase, the slurry, the liquid polymerization process as well as batch, continuous polymerization process, but it is most suitable for slurry and vapor phase reaction.

The batch slurry polymerization process as an example of the polyolefin polymerization method by using the supported catalyst according to the present invention is described as follows.

First, the water and air in the high-pressure reactor are removed under vacuum at high temperature, the solvent is added to the reactor, the temperature is increased to the polymerization temperature, then the alkylaluminum or MAO is added as a scavenger, and the metallocene supported catalyst according to the present invention is added. Then, the olefin such as ethylene, etc., is added, and hydrogen is added together with adding of the olefin as necessary. When the required polymerization time is reached, the addition of the olefin is stopped, unreacted olefin and solvent are removed, and the reactor is opened to yield the polymer in the condition of a solid.

The used polymerization solvent may be re-used after passing through a tube filled with a molecular sieve 5A and activated alumina and removing the water, oxygen and other catalytic poison by bubbling with high purity nitrogen, the polymerization temperature is −50 to 200° C., and suitably 50 to 100° C. The polymerization pressure is 1 to 50 atm, and preferably 5 to 30 atm.

Advantageous Effects

The metallocene supported catalyst supported on the carrier surface-treated with the ionic compound according to the present invention has very excellent catalysis activity and good bulk density of the produced polymer compared to polymer prepared using the existing general supporting method. Therefore, it is very economical and useful to produce the metallocene polyolefin in the commercial slurry or vapor phase process.

BEST MODE

Hereinafter, the embodiments of the present invention will be described in detail with reference to the compared example and example, but the present invention is not limited to the following example.

The supported metallocene catalyst and polymer analysis according to the present invention was carried out by the following method.
1) The amount of the metal among the supported catalyst
  The amount of the metal was measured by ICP (Inductively Coupled Plasma Spectroscopy) analysis and by the following analysis by using IPC analysis apparatus (Perkin Elmer, Optima 200DV).
  Analysis
  The supported catalyst of 60 mg in the glove box was added to the vial having the magnetic bar.
  To the vial containing the supported catalyst, 12 ml nitric acid was added and sufficiently stirred for one hour.
  After one hour, the nitric acid mixture solution was filtered through a filter paper and 1 ml solution was put into a new vial.
  After preparing the 10 times diluted solution by putting 9 ml of distilled water in the new vial, the diluted solution was analyzed ICP.
2) Melt Index
  The melt index was measured on the basis of ASTM D2839.
3) Melting Point Analysis
  This was measured under the condition of $2^{nd}$ heating at a speed of 20° C./min. under nitrogen atmosphere by using Dupont DSC2910.
4) Molecular Weight and Molecular Weight Distribution
  This was measured at a speed of 1 ml/min. at a temperature of 160° C. by using PL GPC210 (Product made by Polymer Laboratories Company) equipped with Column TSK Guard Column HHR(S)+TSK-Gel GMHHR H(S) made by TOHO Company. 1,2,3-trichlorobenzene was used as the solvent, and the molecular weight was calibrated with standard sample PS1A, B (Mw=580~7,500,000).

Example 1

1. Preparation of the Supported Metallocene Catalyst on the Silica Surface-Treated with the Ionic Compound To a round-bottom flask equipped with a stopcock, 1 g of silica XPO-2412 (U.S., Grace Company, surface area 460 m²/g, average pore diameter 12.8 mm) was added, 1-butyl-3-methylimidazolium tetrachloro aluminate of 308 mg (1.0 mmol) was added as the ionic compound and sufficiently stirred at 70° C. for 3 hours by using a magnetic bar to surface-treat with the ionic compound, and 30 ml toluene was added. To a round-bottom flask equipped with another stopcock, 0.35 mmol (n-BuCp)$_2$ZrCl$_2$ and 8 mmol-Al MAO solution diluted in toluene (aluminum content 4.6% by weight, Albermarle Company) was added and stirred at room temperature for 30 min. The metallocene, co-catalyst solution was moved to the surface-treated with the above ionic solution, and was stirred at 70° C. for three hours to support the metallocene and MAO. After stopping the stirring and sinking silica, the upper solution was removed, 50 ml toluene was added and stirred for 10 min. The same procedure was repeated three times and washed. Then, the remaining toluene in the flask for one hour was removed with vacuum to yield the metallocene supported catalyst of 1.58 g.

2. Polymerization of Ethylene Slurry

After 1.5 liter hexane was added to the 2 liter high-pressure reactor and washed at high temperature and vacuum, the temperature was increased to 70° C., 2 mmol-Al MAO was added for the role of scavenger and co-catalyst, and the above prepared metallocene supported catalyst of 8 mg was added to the reactor as the hexane slurry. After the ethylene pressure was controlled to be 7 atm of the total pressure in the reactor, the ethylene gas was added and was saturated, the ethylene polymerization reaction was started by rotating the stirrer. Total polymerization reaction time was 60 min. and the temperature was maintained at about 70° C. After the reaction was finished, the prepared polymer was washed with ethanol and was dried under vacuum to yield the polymer of about 25 g.

Example 2

1. Preparation of the Supported Metallocene Catalyst onto the Surface-Treated Silica with the Ionic Compound The catalyst was prepared according to the procedure for preparing the metallocene supported catalyst of Example 1-1, except that 1-butyl-3-methylimidazolium tetrachloroaluminate of 150 mg was used as the ionic compound to treat the surface of the silica and the metallocene compound [(n-BuCp)$_2$ZrCl$_2$] was supported, the yielded supported catalyst was 1.42 g.

2. Polymerization of Ethylene Slurry

The polymerization reaction was carried out according to the polymerization method of ethylene slurry in 2 of [Example 1] by using the above prepared supported catalyst, to yield about 43 g of polymer.

Example 3

1. Preparation of the Supported Metallocene Catalyst onto the Surface-Treated Silica with the Ionic Compound The catalyst was prepared according to the procedure for preparing the metallocene supported catalyst of Example 1-1, except that 1-butyl-3-methylpyridinium hexafluorophosphate of 150 mg was used as the ionic compound to treat the surface of the silica and the metallocene compound [(n-BuCp)$_2$ZrCl$_2$] was supported, the yielded supported catalyst was 1.44 g.

2. Polymerization of Ethylene Slurry

The polymerization reaction was carried out according to the polymerization method of ethylene slurry in 2 of [Example 1] by using the above prepared supported catalyst, to yield about 42 g of polymer.

Example 4

1. Preparation of the Supported Metallocene Catalyst onto the Surface-Treated Silica with the Ionic Compound The catalyst was prepared according to the procedure for preparing the metallocene supported catalyst of Example 1-1, except that 1-butyl-3-methylpyridinium tetrafluoroborate of 240 mg was used as the ionic compound to treat the surface of the silica and the metallocene compound [(n-BuCp)$_2$ZrCl$_2$] was supported, the yielded supported catalyst was 1.50 g.

2. Polymerization of Ethylene Slurry

The polymerization reaction was carried out according to the polymerization method of ethylene slurry in 2 of [Example 1] by using the above prepared supported catalyst, to yield about 40 g of the polymer.

Example 5

1. Preparation of the Supported Metallocene Catalyst onto the Silica being Surface-Treated with the Ionic Compound To a round-bottom flask equipped with a stopcock, 1 g of silica XPO-2412 (U.S., Grace Company) was added, 1-butyl-3-methylpyridinium chloride of 95 mg was added as the ionic compound and sufficiently stirred at 170° C. for three hours by using a magnetic bar to surface-treat with the ionic compound, the temperature was decreased to 70° C. and 30 ml toluene was added. To a round-bottom flask equipped with another stopcock, 0.35 mmol (n-BuCp)$_2$ZrCl$_2$ and 8 mmol-Al MAO solution being diluted in toluene (aluminum content 4.6% by weight, Albermale Company) were added and stirred at room temperature for 30 min. The metallocene, co-catalyst solution were moved to the surface-treated with the above ionic solution, and was stirred at 70° C. for three hours to support the metallocene and MAO. After stopping the stirring and sinking silica, the upper solution was removed, 50 ml toluene was added and stirred for 10 min. The same procedure was repeated three times and washed. Then, the toluene remaining in the flask was removed with vacuum for one hour to yield the final metallocene supported catalyst of 1.28 g.

2. Polymerization of Ethylene Slurry

The polymerization reaction was carried out according to the polymerization method of ethylene slurry in 2 of [Example 1] by using the above prepared supported catalyst, to yield about 106 g of the polymer.

Example 6

1. Preparation of the Supported Metallocene Catalyst onto the Surface-Treated Silica with the Ionic Compound The catalyst was prepared according to the procedure for preparing the metallocene supported catalyst of Example 5-1, except that 1-butyl-3-methylpyridinium chloride of 290 mg was used as the ionic compound to treat the surface of the silica, the yielded supported catalyst was 1.25 g.

2. Polymerization of Ethylene Slurry

The polymerization reaction was carried out according to the polymerization method of ethylene slurry in 2 of [Example 1] by using the above prepared supported catalyst, to yield about 75 g of the polymer.

Example 7

1. Preparation of the Supported Metallocene Catalyst to the Silica being Surface-Treated with the Ionic Compound To a round-bottom flask equipped with a stopcock, 1 g of silica XPO-2412 (U.S., Grace Company) was added, 1-butyl-3-methylpyridinium chloride of 290 mg was added as the ionic compound and sufficiently stirred at 170° C. for three hours by using a magnetic bar to surface-treat with the ionic compound, the temperature was decreased to 70° C. and 15 ml toluene was added. To a round-bottom flask equipped with another stopcock, 0.35 mmol (n-BuCp)$_2$ZrCl$_2$, 0.42 mmol triphenylcarboniumpentafluorophenylborate, 0.7 mmol triethylaluminium, and 20 ml toluene were added and stirred at room temperature for 30 min. The metallocene compound, co-catalyst solution were moved to the surface-treated with the above ionic solution, and was stirred at 70° C. for two hours to support the metallocene compound and the borate compound. After stopping the stirring and sinking silica, the upper solution was removed, 50 ml toluene was added and stirred for 10 min. The same procedure was repeated three times and washed. Then, the toluene remaining in the flask for 1 hour was removed with vacuum to yield the final metallocene supported catalyst of 1.54 g.

2. Polymerization of Ethylene Slurry

The polymerization reaction was carried out according to the polymerization method of ethylene slurry in 2 of [Example 1] by using the above prepared supported catalyst, to yield about 30 g of the polymer.

Comparative Example 1

1. Preparation of the Metallocene Supported Catalyst

To a round-bottom flask equipped with a stopcock, 1 g of silica XPO-2412 was added and 30 ml toluene was added. To a round-bottom flask equipped with another stopcock, 8 mmol-Al MAO and 0.35 mmol (n-BuCp)$_2$ZrCl$_2$ in toluene solution were added and stirred for 30 min. The above mixed solution was moved to the flask containing the prepared silica and stirred at 50° C. for one hour. After stopping the stirring and sinking silica, the upper solution was removed, 50 ml toluene was added and stirred for 10 min. The same procedure was repeated three times. Then, the toluene remaining in the flask was removed with vacuum for one hour to yield the metallocene supported catalyst of 1.10 g.

2. Polymerization of Ethylene Slurry

The polymerization reaction was carried out according to the polymerization method of ethylene slurry in 2 of [Example 1] by using the above prepared supported catalyst, to yield about 41 g of the polymer.

Comparative Example 2

1. Preparation of the Metallocene Supported Catalyst

To a round-bottom flask equipped with a stopcock, 1 g of silica XPO-2412 was added. To a round-bottom flask equipped with another stopcock, 3 mmol-Al MAO and 0.35 mmol (n-BuCp)$_2$ZrCl$_2$ in toluene solution were added and stirred for 30 min. The above mixed solution was moved to the flask containing the prepared silica and stirred at 50° C. for one hour. After stopping the stirring, the remaining toluene in the flask was removed with vacuum for one hour to yield the metallocene supported catalyst of 0.98 g.

2. Polymerization of Ethylene Slurry

The polymerization reaction was carried out according to the polymerization method of ethylene slurry in 2 of [Example 1] by using the above prepared supported catalyst, to yield about 11 g of the polymer.

TABLE 3

Catalyst Synthesis Table

| | Ionic compound | Ionic compound treating temperature | Ionic compound amount of adding | Supported metallocene compound | Supported co-catalyst |
|---|---|---|---|---|---|
| Example 1 | 1-butyl-3-methylimidazolium tetrachloroaluminate | 70 | 1.0 | (n-BuCp)$_2$ZrCl$_2$ | MAO |
| Example 2 | 1-butyl-3-methylimidazolium tetrachloroaluminate | 70 | 0.5 | | MAO |
| Example 3 | 1-butly-4-methylpyridinium hexafluorophosphate | 70 | 0.5 | (n-BuCp)$_2$ZrCl$_2$ | MAO |
| Example 4 | 1-butyl-4-methylpyridinium tetrafluoroborate | 70 | 1.0 | (n-BuCp)$_2$ZrCl$_2$ | MAO |
| Example 5 | 1-butyl-4-methylpyridinium chloride | 170 | 0.5 | (n-BuCp)$_2$ZrCl$_2$ | MAO |
| Example 6 | 1-butyl-4-methylpyridinium chloride | 170 | 1.5 | (n-BuCp)$_2$ZrCl$_2$ | MAO |
| Example 7 | 1-butyl-4-methylpyridinium chloride | 170 | 1.5 | (n-BuCp)$_2$ZrCl$_2$ | Ph3C—B(C6F5)4 |
| Comparative Example 1 | — | — | — | (n-BuCp)$_2$ZrCl$_2$ | MAO |
| Comparative Example 2 | — | — | — | (n-BuCp)$_2$ZrCl$_2$ | MAO |

* Ph3C—B(C6F5)4: triphenylcarboniumpentafluorophenyl boron

TABLE 4

Polymerization Requirements and Results

| | Co-catalyst when polymerizing | Solvent | Amount of catalyst (mg) | PE Yield (g) | Activity | MI | GPC MWD | DSC (° C.) | Apparent Density |
|---|---|---|---|---|---|---|---|---|---|
| Example 1 | MAO | n-hexane | 8 | 25 | 3.1 | Measurement imposible | — | 136 | 0.30 |
| Example 2 | MAO | n-hexane | 7 | 43 | 6.2 | Measurement impossible | — | 138 | 0.29 |
| Example 3 | MAO | n-hexane | 7 | 42 | 6.0 | Measurement impossible | — | 136 | 0.29 |
| Example 4 | MAO | n-hexane | 9 | 40 | 4.5 | 0.005 | 2.8 | 137 | 0.28 |
| Example 5 | MAO | n-hexane | 11 | 106 | 9.7 | 0.008 | 2.4 | 135 | 0.30 |
| Example 6 | MAO | n-hexane | 10 | 75 | 7.5 | 0.001 | 2.3 | 135 | 0.31 |
| Example 7 | MAO | n-hexane | 12 | 30 | 2.5 | 0.002 | 2.4 | 132 | 0.32 |
| Comparative Example 1 | MAO | n-hexane | 10 | 41 | 4.1 | 0.06 | 2.3 | 138 | 0.30 |
| Comparative Example 2 | TEAL | n-hexane | 15 | 11 | 0.7 | 0.24 | 2.3 | 140 | 0.32 |

*activity: kg-PE/g-cat., hr, 7 bar
*M.I: g/10 min.
*polymerization pressure and time: 6~7 bar, 60 min.

The invention claimed is:

1. A supported metallocene catalyst composition for polymerizing olefin prepared by supporting a group IV transition metal compound represented by Chemical Formula 1 upon an inorganic or organic porous carrier treated with an ionic compound represented by Chemical Formula 2:

$$Cp'L^1ML^2{}_n \qquad \text{[Chemical Formula 1]}$$

where,

M is a Group IV transition metal of a Periodic Table of the Elements;

Cp' is a cyclopentadienyl containing group being able to form $\eta^5$-bond with the central metal M;

$L^1$ is a fused ring having cyclopentadiene, cyclopentadienyl ring or an anionic ligand including (C1-C20) hydrocarbon substituent and O, N or P atom;

$L^2$ is halogen atom, (C1-C20) alkyl group, (C6-C30) aryl (C1-C20) alkyl group, (C3-C20) cycloalkyl group, (C1-C20) alkoxy group, (C6-C30) aryloxy group, (C6-C30) aryl group, (C1-C20) alkyl substituted or (C6-C30) aryl substituted silyl group, (C1-C20) alkyl substituted or (C6-C30) aryl substituted amino group, (C1-C20) alkyl substituted or (C6-C20) aryl substituted siloxy group, and (C1-C20) alkyl substituted or (C6-C30) aryl substituted phosphine group;

n is an integer of 1 or 2;

Cp' and $L^1$ are optionally bridged through a silicon containing group or (C1-C4) alkenylene group;

the cyclopentadienyl ring or cyclopentadienyl fused ring of the Cp' and $L^1$ may be further substituted with (C1-C20) alkyl group, (C6-C30) aryl group, (C2-C20) alkenyl group or (C6-C30) aryl (C1-C20) alkyl group;

$$X^+Y^- \qquad \text{[Chemical Formula 2]}$$

where, $X^+$ is imidazolium ion, pyridium ion, ammonium ion, phosphonium ion, sulfonium ion, pyrazolium ion or pyrrolidium ion; and $Y^-$ is $BF_4^-$, $PF_6^-$, $AlCl_4^-$, halogen$^-$, $CH_3CO_2^-$, $CF_3CO_2^-$, $CH_3SO_4^-$, $CF_3SO_3^-$, $(CF_3SO_2)N^-$, $NO_3^{31}$, $SbF_6^-$, $Sb_2F11^-$, $MePhSO_3^-$, $(CF_3SO_2)_2N^-$, $(CF_3SO_2)_3C^-$ or $(OR)_2PO_2^-$.

2. The supported metallocene catalyst composition of claim 1, wherein the ionic compound of the Chemical Formula 2 is selected from the 1-butyl-3-methylimidazolium chloride, 1-butyl-3-methylimidazolium dibutylphosphate, 1-butyl-3-methylimidazolium dicyanamide, 1-butyl-3-methylimidazolium hexafluoroantimonate, 1-butyl-3-methylimidazolium hexafluorophosphate, 1-butyl-3-methylimidazolium hydrogencarbonate, 1-butyl-3-methylimidazolium hydrogensulfate, 1-butyl-3-methylimidazolium methylsulfate, 1-butyl-3-methylimidazolium tetrachloroaluminate, 1-butyl-3-methylimidazolium tetrachloroborate, 1-butyl-3-methylimidazolium thiocyanate, 1-dodecyl-3-methylimidazolium iodide, 1-ethyl-2,3-dimethylimidazolium chloride, 1-ethyl-3-methylimidazolium bromide, 1-ethyl-3-methylimidazolium chloride, 1-ethyl-3-methylimidazolium hexafluorophosphate, 1-ethyl-3-methylimidazolium tetrafluoroborate, 1-hexyl-3-methylimidazolium tetrafluoroborate, 1-butyl-4-methylpyridium chloride, 1-butyl-4-methylpyridium tetrafluoroborate, 1-butyl-4-methylpyridium hexafluorophosphate, benzyldimethyltetradecylammonium chloride, tetraheptylammonium chloride, tetrakis(decyl)ammonium bromide, tributylmethylammonium chloride, tetrahexylammonium iodide, tetrabutylphosphonium chloride, tetrabutylphosphonium tetrafluoroborate, triisobutylmethylphosphonium tosylate 1-butyl-1-methylpyrrolidinium, 1-butyl-1-methyl-methylpyrrolidium bromide, 1-butyl-1-methylpyrrolidium tetrafluoroborate, 1-aryl-3-methylimidazolium bromide, 1-aryl-3-methylimidazolium chloride, 1-benzyl-3-methylimidazolium hexafluorophosphate, 1-benzyl-3-methylimidazolium bis(trifluoromethylsulfonyl)imide, 1-butyl-3-methylimidazolium dibutyl phosphate, 1-(3-cyanopropyl)-3-methylimidazolium bis(trifluoromethylsulfonyl)amide, 1,3-dimethylimidazolium dimethyl phosphate and 1-ethyl-2,3-dimethylimidazolium ethyl sulfate, or the mixture thereof.

3. The supported metallocene catalyst composition of claim 1, wherein the supported catalyst composition further includes alkylaluminoxane co-catalyst, organic aluminum co-catalyst or boron compound co-catalyst or the mixture thereof.

4. The supported metallocene catalyst composition of claim 3, wherein the alkyl aluminoxane co-catalyst is selected from methylaluminoxane, ethylaluminoxane, propylaluminoxane, butyl aluminoxane and isobutyl aluminoxane compound;

the organic alkyl aluminum co-catalyst is selected from trimethylaluminum, triethyl aluminum and diisobutylaluminum chloride compound;

the boron compound co-catalyst is selected from the group consisting of tris(pentafluorophenyl)borane, N,N-dimethylaniliumtetrakispentafluorophenylborate and triphenylmethylliniumtetrapentakisfluoroborate.

5. The supported metallocene catalyst composition of claim 1, wherein the Cp' is selected from the group consisting of cyclopentadienyl, methylcyclopentadienyl, dimethylcyclopentadienyl, tetramethylcyclopentadienyl, pentamethylcyclopentadienyl, butylcyclopentadienyl, sec-butylcyclopentadienyl, tert-butylmethylcyclopentadienyl, trimethylsillylcyclopentadienyl, indenyl, methylindenyl, ethylindenyl, isopropylindenyl, fluorenyl, methylfluorenyl, dimethylfluorenyl and ethylfluorenyl, isopropylfluorenyl.

6. The supported metallocene catalyst composition of claim 1, wherein the inorganic or organic porous carrier being treated with the ionic compound is treated by:

a) bringing the ionic compound alone into contact with a carrier without solvent, or b) mixing the carrier and the ionic compound in the aliphatic or aromatic hydrocarbon solvent to obtain the slurry, isolating and drying the slurry.

7. The supported metallocene catalyst composition of claim 1, wherein the ionic compound is 0.001 to 50% by weight based on the treated support.

8. The supported metallocene catalyst composition of claim 3, wherein the ratio of the supported transition metal compound of Chemical Formula 1: aluminoxane co-catalyst is 1:0.01 to 1:1000 based on the molar ratio of the transition metal:aluminum.

9. The supported metallocene catalyst composition of claim 3, wherein the ratio of the supported transition metal compound of Chemical Formula 1: boron compound co-catalyst is 1:0.01 to 1:100 based on the molar ratio of the transition metal:boron.

10. The supported metallocene catalyst composition of claim 1, wherein the carrier is selected from silica, alumina, magnesium chloride, magnesium oxide, mineral clay, kaolin, talc, mica, montmorillonite, polysiloxane-based polymer compound and polystyrene, or the mixture thereof.

11. A method for preparation of an olefin polymer in the presence of the supported metallocene catalyst composition of claim 1.

12. The method according to claim 11, wherein the olefin polymer is homopolymer or copolymer of alphaolefin.

13. The method according to claim 12, wherein the alpha-olefin is selected from ethylene, propylene, 1-butene, 1-pentene, 1-hexene, 1-octene, 1-decene, 1-dodecene, 4-methyl-1-pentene, 3-methyl-1-pentene and 3-methyl-1-butene, or the mixture thereof.

* * * * *

UNITED STATES PATENT AND TRADEMARK OFFICE
CERTIFICATE OF CORRECTION

PATENT NO.       : 8,399,375 B2                                              Page 1 of 1
APPLICATION NO.  : 12/933796
DATED            : March 19, 2013
INVENTOR(S)      : Han et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 171 days.

Signed and Sealed this
First Day of September, 2015

Michelle K. Lee
*Director of the United States Patent and Trademark Office*